United States Patent [15] 3,660,601

Dobson [45] May 2, 1972

[54] FREQUENCY DETECTION SYSTEM

[72] Inventor: Donald R. Dobson, Lexington, Ky.

[73] Assignee: International Business Machines Corporation, Armonk, N.Y.

[22] Filed: June 10, 1970

[21] Appl. No.: 44,960

[52] U.S. Cl. ..........178/88, 329/104, 328/127, 325/320

[51] Int. Cl. ..........H04l 15/24

[58] Field of Search ..........178/66, 88; 325/30, 320, 329; 329/104, 126; 307/233, 295; 331/179; 328/140, 141, 127

[56] References Cited

UNITED STATES PATENTS

| | | | |
|---|---|---|---|
| 3,435,354 | 3/1969 | Grace | 329/126 |
| 3,252,098 | 5/1966 | Schlaepfer | 328/127 |
| 3,506,924 | 4/1970 | Dixon | 329/104 |

*Primary Examiner*—Albert J. Mayer
*Attorney*—Hanifin and Jancin and John W. Girvin, Jr.

[57] ABSTRACT

A system for detecting frequency shift keying information on a real time basis independent of the amplitude of the input FSK signal. The second derivative of the input voltage waveform signal which is in exact phase with the input signal is obtained. The gain of the differentiated voltage signal is controlled so that when the input signal has a frequency below predetermined frequency, the magnitude o2 the differentiated voltage signal will be less than the magnitude of the input voltage signal at all points except zero; and when the input signal exceeds the predetermined frequency, the magnitude of the differentiated voltage signal exceeds that of the input voltage signal. The input signal and the gain controlled differentiated signal are magnitude compared and an output signal representative of the result of the comparison and hence of the frequency of the input signal is supplied. A low pass filter introducing minimal signal delay is utilized to remove possible logic silvers at the time when both signals are zero and when there is an input frequency change.

7 Claims, 3 Drawing Figures

INVENTOR
DONALD R. DOBSON

BY John W Girvin, Jr.
ATTORNEY.

Patented May 2, 1972 3,660,601

2 Sheets-Sheet 2

FREQUENCY DETECTION SYSTEM

BACKGROUND OF INVENTION

1. Field

This invention relates to a method of and means for demodulating a frequency modulated carrier which is modulated by a binary signal, and more particularly, to an improved FSK detector for detecting information on a real time basis and without introducing appreciable signal delay.

2. Description of the Prior Art

In data communication systems which require the transmission of binary signals, it is common to use a frequency shift keying system to generate a frequency modulated signal for convenient transmission over a communication line. The demodulator for such a system must determine which of a plurality of frequencies is present in order to ascertain whether the signal coming off the line is indicative of binary 1 or binary 0 data information. Various frequency discriminators are known in the art and one of the more prevalent types utilized to detect FSK signals consists of a plurality of tuned circuits, each circuit being selectively responsive to one of the two respective frequencies of the FSK input signal. The major disadvantages of this type of system include high cost, low interchangeability and slow response time in that for such a filter to respond, a predetermined period of time must elapse in order for the filter to achieve a steady state and detect the tuned frequency. Accordingly, the carrier signal must be modulated with a signal of sufficient duration to be detected by the discriminator. Such a limitation places a severe constraint on maximum bandwidth utilization of the communication channel. A second common approach is to utilize the zero crossing of the input voltage waveform to trigger a timing circuit of predetermined time duration. The output of the timing circuit is utilized to sample the input waveform which has previously been limited. The sampled waveform is then sent through a low pass filter and limiter to provide a binary signal representative of the binary significance of the FSK data. The band pass filter must reject the low FSK frequency and pass the data frequency. Accordingly, the maximum repetition rate of the data signal is limited by the lower FSK frequency. Thus, the maximum bandwidth utilization capability of the communication facility is not utilized since the detector places a limitation on the repetition rate of the data frequency. Additionally, the band pass filter utilized effects considerable delay in recognizing the received signal.

SUMMARY

In order to overcome the above noted shortcomings and problems of the prior art, the present invention incorporates a system wherein the maximum bandwidth capability of the communication channel is utilized and the signal is received on virtually a real time basis. According to one aspect of the invention, the second derivative of the input voltage waveform is compared with the inverted input voltage waveform on a real time basis. The magnitude of the differentiated voltage signal is controlled so that when the lower FSK frequency or space frequency is received, the magnitude of the differentiated voltage signal will be less than the magnitude of the input voltage signal at all points except the zero crossover points. In a similar manner, the gain control causes the magnitude of the differentiated voltage signal to be greater than the magnitude of the input voltage signal when the high frequency FSK signal or mark frequency signal is received. Accordingly, a digital output signal is provided indicative of the received frequency as a result of the comparison of the magnitude of the two signals. A very wide bandwidth low pass filter is utilized to smooth logic slivers which possibly occur at the zero crossover points. Since the bandwidth of this filter is extremely wide and primarily dependent upon the quality of the logic circuits utilized in the detector, high data repetition rates can be effected, the only limitation on the data repetition rate being that provided by the communication channel.

The foregoing and other features and advantages of the invention will be apparent from the following more particular description of the preferred embodiment as illustrated in the accompanying drawings.

GENERAL DESCRIPTION

Figure 1:
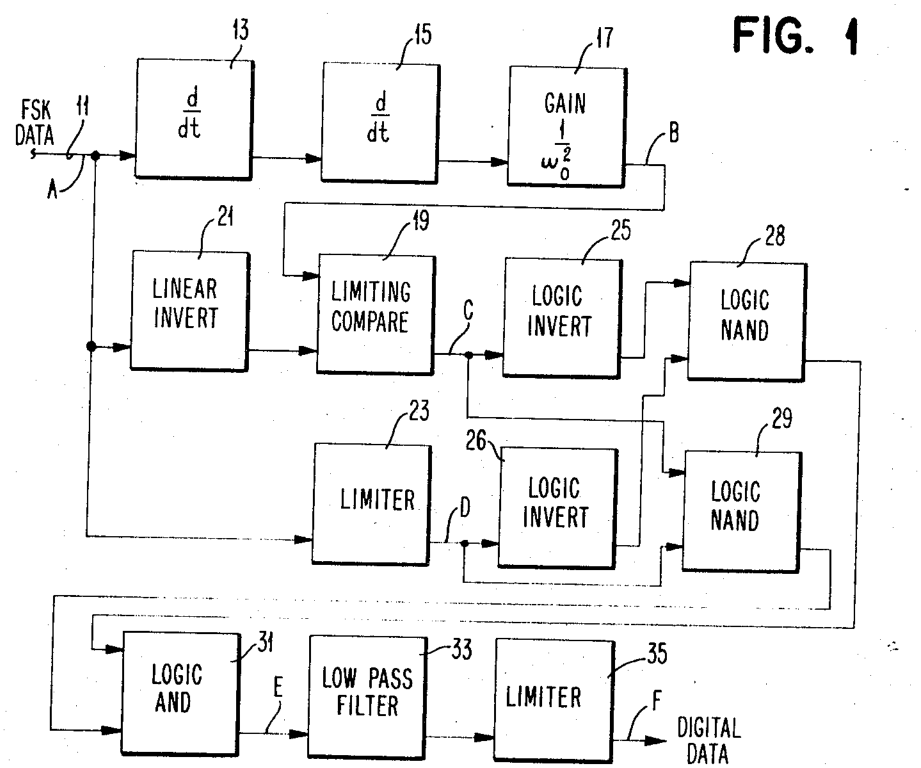
FIG. 1 is a schematic block diagram of the frequency detection system of the present invention.

Referring now to FIG. 1 of the drawings, a schematic block diagram of the frequency detection system of the present invention is depicted. Input frequency shift keying (FSK) data from a communication channel is transmitted over line 11 to the detector system. The FSK data is a voltage waveform of one of two predetermined frequencies depending upon the binary significance of the data. This voltage waveform is differentiated by differentiator 13 and the output signal of the differentiator 13 is again differentiated by differentiator 15. The output signal of the differentiator 15 thus represents the second derivative of the input voltage waveform and will hereinafter be referred to as the differentiated signal. The amplitude of the differentiated signal is controlled by the gain adjustment circuit 17 which has a gain of $1/\omega o^2$ where $\omega o$ is a frequency intermediate the two FSK frequencies. The output signal of the gain adjustment circuit 17 is provided to a limiting compare circuit 19. Additionally, the input voltage waveform is inverted by linear inverter 21 and also supplied to the limiting compare circuit 19. The limiting compare circuit provides an instantaneous limited output signal indicating whether the differentiated signal is more positive or less positive than the input signal. Whenever the input frequency is greater than the reference frequency, $\omega o$, the magnitude of the differentiated signal appearing at the input of the limiting compare circuit 19 is greater than the magnitude of the input signal. Conversely, whenever the input frequency is less than the predetermined reference frequency, $\omega o$, the magnitude of the differentiated signal is less than the magnitude of the input signal. Accordingly, as will be apparent, when the high frequency signal is received, the differentiated signal is more positive than the inverted input signal only during positive excursions of the inverted input signal. When the low frequency signal is received, the differentiated signal is more positive than the inverted input signal only during the negative excursions of the inverted input signal. As will be described, the logic circuits 23 through 31 logically combine the input signal with the output of the limiting compare circuit to determine the binary significance of the FSK signal.

The following discussion will describe the magnitude relationships of the differentiated signal and the input signal. Consider the input signal to be described by the equation:

$e_1 = K_1 \text{Sin}\,(\omega t)$

Then taking the second derivative with respect to time:

$d^2e_1/dt^2 = -K_1\omega^1 \text{Sin}\,(\omega t)$ let $e_2$ 32 $-Gd^2e_1/dt^2 = GK_1\omega^2 \text{Sin}\,(\omega t)$ The signal $e_2$ is in exact phase with the signal $e_1$ and the relative values of these signals can be compared on an instantaneous basis. The magnitude of the gain G is controlled so that for a reference frequency, $\omega o$, of a frequency in between the two frequencies that represent a mark and a space for the FSK information, $G = 1/\omega o^2$.

Then for the condition in which the input frequency, $\omega$, is less than the reference frequency, $\omega o$, the magnitude of $GK_1\omega^2$ Sin $(\omega t)$ will be less than $K_1$Sin $(\omega t)$ or the magnitude of $e_2$ will be less than the magnitude of $e_1$ at all points except zero. In a similar manner, for the condition in which the input frequency, $\omega$, is greater than the reference frequency, $\omega o$, the magnitude of $GK_1\omega^2$Sin $(\omega t)$ will be greater than the magnitude of $K_1$ Sin ($\omega t$) or the magnitude of $e_2$ is greater than the magnitude of $e_1$ at all points except zero. The above conditions are met regardless of the amplitude of the input waveform. With this information, the magnitude of $e_1$ can be compared with the magnitude of $e_2$ on a real time basis to determine whether a mark or space frequency signal is being received. Some small amount of low pass filtering is necessary to remove possible logic slivers at the time in which both $e_1$ and $e_2$ are zero and where there is an input frequency change. Theoretically $e_2$ becomes infinite at an input frequency change. However, the actual effect is to cause saturation of the differentiating amplifier for a short time period as will be discussed hereinafter with respect to FIG. 3 of the drawings.

Referring once again to FIG. 1 of the drawings, the input voltage signal appearing on line 11 is limited by limiter 23. The output signals of the limiting compare circuit 19 and the limiter 23 are provided to various logic circuits. The function of the logic circuits is to provide a binary digital signal indicating the result of the compare operation performed by the limiting compare circuit 19 since the output signal of the limiting compare circuit 19 only indicates when the voltage of the differentiated signal is more positive than the voltage of the inverted input signal. Since the differentiated voltage is more positive during the negative half cycles of the inverted space (low) frequency component and during the positive half cycles of the inverted mark (high) frequency component, (see waveforms 60 and 61 of FIG. 2) it is necessary to logically compare this output signal with the limited input signal to determine whether a mark or space frequency signal has been received. Since the limited input signal always follows the output signal of the limiting compare circuit whenever a space frequency signal is received and differs in polarity from that signal whenever a mark frequency signal is received, (see waveforms 62 and 63 of FIG. 2) the logic inverters 25 and 26 and the logic NAND circuits 28 and 29 and the logic AND circuit 31 are responsive to the output signals of the limiting compare circuit 19 and the limiter 23 to provide an output signal (see waveform 64 of FIG. 2) whose output level is indicative of the reception of a mark or space signal. The function of this logic is that of an inverted exclusive OR. That is, the logic provides an output signal having a positive level whenever the output signal of the limiting compare circuit 19 is the same as the output signal of the limiter 23 and provides a negative output signal whenever the output signal of the limiting compare circuit 19 differs from the output signal of the limiter 23. Since the switching times of the various logic circuits involved vary and since the sharpness of the waveforms produced by the limiting circuit vary in accordance with components selected, it is possible that logic slivers may exist when the input waveform passes through a zero crossover condition. Accordingly, a low pass filter 33 is provided to remove such logic slivers. The output signal of the low pass filter is then provided to the utilization logic of the system which is responsive to the binary significance of the output signal of the filter to indicate the received data.

Figure 2:
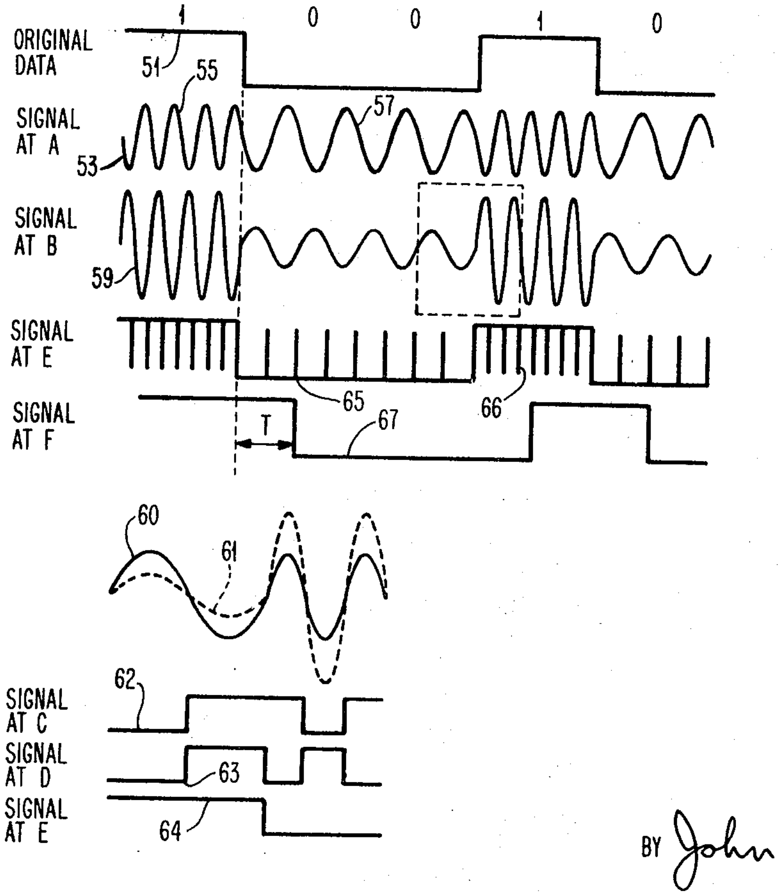
FIG. 2 is a pictorial illustration of voltage waveforms appearing at various points in the block diagram of FIG. 1 and the circuit diagram of FIG. 3.

Referring now to FIG. 2 of the drawings, various waveforms representative of the signals appearing at various points in FIG. 1 of the drawings are depicted. An original binary level data waveform representative of information to be transmitted over a communication channel is depicted by waveform 51. As depicted, binary one information is represented by the positive level of the waveform while binary zero information is represented by the negative level of the waveform. This information is converted by conventional techniques into a frequency shift key modulated waveform signal as depicted by waveform 53. This waveform typically comprises two frequency components, an upper frequency component 55 and a lower frequency component 57. The upper frequency or mark frequency is transmitted whenever it is desirous to transmit binary one information while the lower frequency or space frequency is transmitted whenever data of binary zero significance is to be transmitted. This waveform is transmitted over the communication channel and appears on line 11 at point A of FIG. 1. As described above, the input signal is differentiated twice and its gain is modified by a function of a frequency intermediate the space and mark frequencies. This waveform appearing at point B in FIG. 1 is shown by waveform representation 59.

As has been described, the waveform 53 is inverted and compared with the waveform 59 by the limiting compare circuit 19 of FIG. 1 which provides an output signal waveform having an up level whenever the waveform 59 is more positive than an inverted representation of waveform 53. Waveforms 60 and 61 represent, respectively, the inverted input waveform 53 and the waveform 59 drawn on an expanded time scale and superimposed on one another. Waveform 61 thus corresponds to that portion of waveform 59 shown within broken lines. Waveform 62 represents the output signal of the limiting compare circuit at point C of FIG. 1 on the expanded time scale and is positive whenever waveform 61 is more positive than waveform 60. Waveform 63 is representative of a limited version of the input signal on the expanded time scale as it appears at point D of FIG. 1. Waveform 64 is representative of the output signal at point E of FIG. 1 on the expanded time scale and is positive whenever the signals at points C and D are alike. This logic level output signal waveform also depicted by waveform 65 contains possible switching slivers denoted by slivers 66 which are filtered by the wide bandwidth low pass filter 33 of FIG. 1 so that the output signal of the band pass filter appears as waveform 67. It is noted that waveform 67 is delayed from waveform 65 by a time interval T representative of the time delay introduced by the band pass filter.

Figure 3:
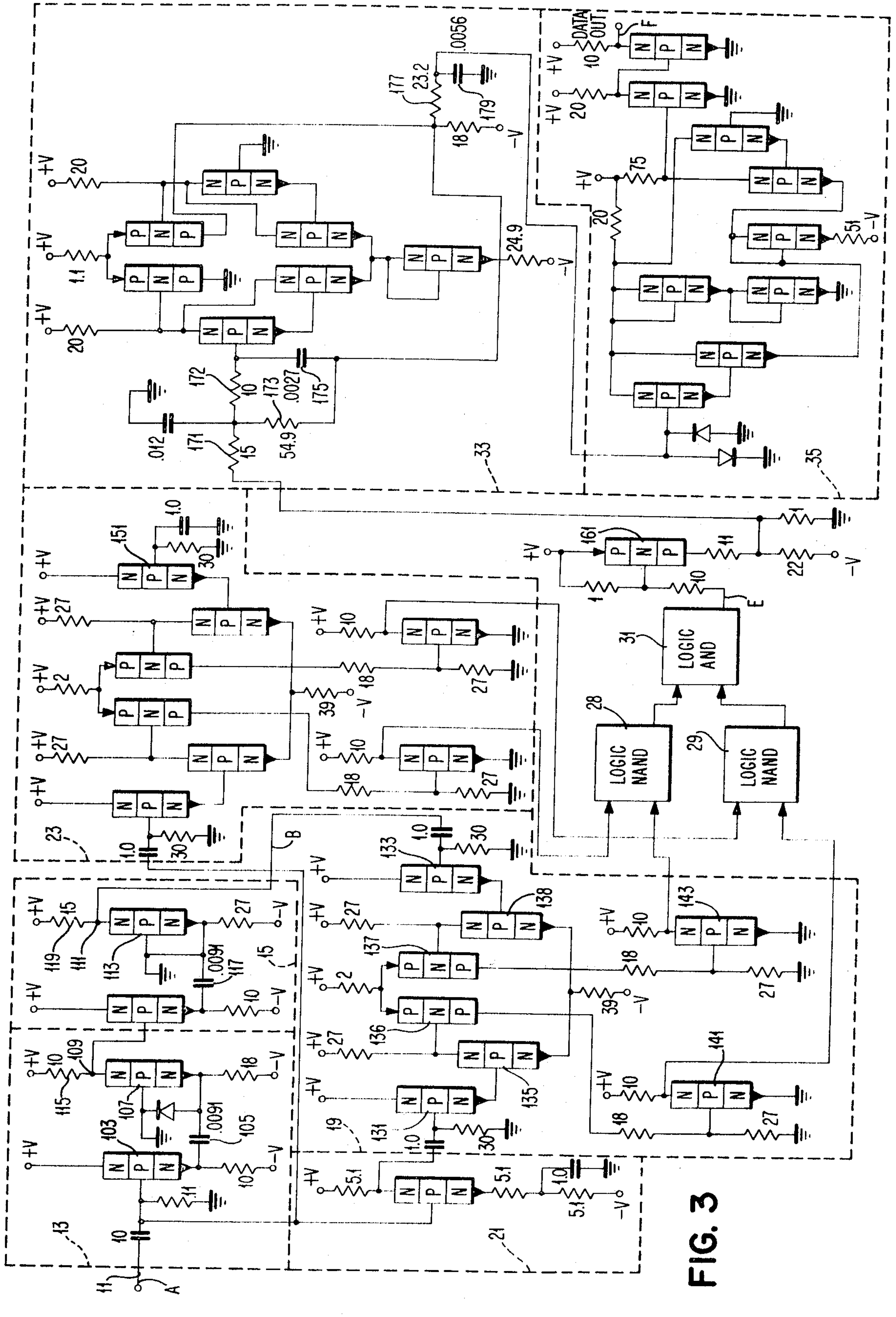
FIG. 3 is a detailed schematic circuit diagram of the frequency detection system depicted in FIG. 1.

Referring now to FIG. 3 of the drawings, a detailed schematic diagram of the circuits utilized in the system of FIG. 1 of the drawings is depicted.

Where possible, the same block numbers utilized in FIG. 1 are utilized to define corresponding blocks shown in broken line in FIG. 3. However, it should be noted that one block of FIG. 3 may perform the functions of one or more corresponding blocks in FIG. 1. For example, as will be described, block 13 of FIG. 3 performs the function ascribed to block 13 of FIG. 1 as well as a portion of that ascribed to block 17 of FIG. 1.

The input voltage waveform is applied over line 11 to the base electrode of transistor 103 of differentiator 13, the transistor acting as an emitter follower. The current waveform through capacitor 105 is proportional to the derivative of the input voltage waveform and is applied to the emitter electrode of the low imput impedance amplifier transistor 107 which provides a voltage output at its collector electrode 109 representative of the inverted differentiated input signal appearing on line 11. This signal is then applied to differentiator 15 which operates in an identical manner to that described with respect to differentiator 13. Thus, the signal appearing at the collector electrode 111 of transistor 113 is representative of the negative of the second derivative of the input signal appearing on line 11. The ratio of capacitor 105 to collector resistor 115 of block 13 and the ratio of capacitor 117 to collector resistor 119 of block 15 controls the gain of each of the stages. The gain, $G$, of the two stages is chosen so that $G\omega o^2 = -1.0$ where $\omega o$ is intermediate the mark and space frequencies. Accordingly, blocks 13 and 15 of FIG. 3 also perform the function of block 17 of FIG. 1. Additionally, it should be noted that the differentiator 15 is driven to cutoff or saturation when an input frequency change occurs. This creates possible logic slivers which are later filtered.

The differentiated output signal appearing at the collector electrode 111 is then applied to the limiting compare circuit 19. Additionally, the input signal on line 11 is provided to the inverter circuit 21 and the output of the inverter circuit 21 is also applied to the limiting compare circuit 19. The limiting compare circuit comprises two emitter follower stages 131 and 133 responsive respectively to the inverted input signal and the differentiated signal. Transistors 135 through 138 form a differential amplifier and each phase of the output signal of the amplifier is provided to transistors 141 and 143 which provide signal amplification. The out of phase output signal provided by the differential amplifier is utilized to perform the function ascribed to the logic inverter 25 of FIG. 1.

The functions of the limiter circuit 23 and the logic inverter 26 of FIG. 1 are performed by limiter circuit 23 of FIG. 3 which is identical to the limiting compare circuit 19 of FIG. 3 except the limiter circuit is responsive to a grounded input signal at the base electrode 151 of the emitter follower transistor 152 instead of the differentiated input signal. The output signals of this stage and of transistors 141 and 143 of the limiting compare circuit 19 are applied to the logic NAND circuits 28 and 29. The output signals of the NAND circuits are applied to the logic AND circuit 31 and the output signal of this circuit is applied to a logic level translator comprising transistor 161 and its associated components. The NAND and AND circuits are well known in the art and accordingly, a detailed description thereof has been omitted.

The output signal of the split collector resistor of transistor 161 swings from a voltage level of −0.6 volts to +0.6 volts indicating the binary significance of the received data. This signal is applied to the low pass filter 33. This filter is an active filter comprising a high gain amplifier with large high frequency negative feedback to yield a low pass response. Resistors 171, 172, 173 and capacitor 175 along with resistor 177 and capacitor 179 are sized to determine the bandwidth of the filter. With the indicated values, the bandwidth of this filter to the 3 db level is 1,200 Hz. The output signal of the filter is then applied to a limiter circuit 35 which squares the waveform and converts it to logic levels for use by a utilization circuit.

All of the resistor values depicted in FIG. 3 of the drawings are in K-Ohms and the values of the capacitors are in $\mu$f. The positive voltage supply is 12 volts and the negative voltage supply is minus 12 volts. When utilizing these values, the circuit detects a mark frequency of 2,200 Hz and a space frequency of 1,200 Hz, the intermediate frequency being 1,700 Hz.

OPERATION

Referring once again to FIGS. 1 and 2 of the drawings, an input FSK signal 53 is applied over line 11 to the frequency detection system. The input signal is differentiated by differentiator 13 and again differentiated by differentiator 15, the gain of the differentiated signal being controlled as a function of the reciprocal of the square of a frequency intermediate to the mark and space frequencies of the frequency shift information. This gain controlled differentiated signal 59, 61 of FIG. 2 is compared with the inverted FSK signal 60 of FIG. 2 by the limiting compare circuit 19 which provides an output signal 62 whenever the differentiated signal has a voltage which is more positive than that of the inverted input signal. The FSK input signal is limited by limiter 23 and the logic blocks 25–31 switch the output signal of the limiting compare circuit 19 and the output signal of the limiter 23 to provide an output signal 64, 65 of FIG. 2 which indicates when both input signals are the same. The output signal of the logic blocks is passed through a low pass filter which eliminates logic slivers 66 of FIG. 2 which may occur when the frequency of the input waveform changes or when the input waveform passes through its midpoint. The output signal of the low pass filter 33 is provided to a limiter 35 which provides a digital data output signal 67 of FIG. 2 representative of the binary content of the input FSK signal. This signal is delayed by a time interval T by the low pass filter 33. Because the function of the filter 33 is to filter out the logic slivers 66, the filter may be of the wide bandwidth type which passes both the low and high frequency components of the input FSK signal. Accordingly, this filter differs in function from those disclosed in the prior art which pass the data signal but which must not pass the lower FSK frequency and effects a much smaller delay T than the narrow bandwidth filters of the prior art.

It is, of course, recognized by those skilled in the art that various circuits can be utilized to perform the functions ascribed to the various logic blocks of FIG. 1. For example, block 19 and blocks 23 through 31 perform the function of comparing the magnitudes of the inverted input signal and the differentiated signal on an instantaneous basis and provide a logic level output signal indictative of the result of the comparison. Various circuits other than those described by the block diagram of FIG. 1 and the corresponding circuit diagram of FIG. 3 could be utilized to perform these functions. Additionally, the output signal of block 17 could be inverted prior to entering the limiting compare block 19 and the input signal on line 11 could be directly feed to the limiting compare block 19, it being immaterial which one of the two signals is inverted. Additionally, circuits 13 and 15 perform both the function of differentiating the input signal and controlling the gain thereof. As is appreciated by those skilled in the art, various other circuits could be utilized in conjunction therewith to provide the gain control feature.

While this invention has been particularly shown and described with reference to a perferred embodiment thereof, it should be understood by those skilled in the art that the foregoing and other changes in form and detail may be made therein without departing from the scope of the invention.

What is claimed is:

1. A system for detecting a frequency shift signal representative of binary data comprising:

conveying means for conveying a frequency shift signal representative of binary data having at least a first frequency and a second frequency;

differentiating means connected to the conveying means and responsive to said frequency shift signal for differentiating the frequency shift signal with respect to time and for providing a differentiated signal representative of the second derivative with respect to time of the frequency shift signal;

gain control means for controlling the gain of at least one of the differentiated signal and the frequency shift signal so that the relative gain of the differentiated signal is proportional to the reciprocal of the square of a frequency intermediate said first frequency and said second frequency;

means for inverting one of said frequency shift signal and said differentiated signal;

comparing means for comparing the magnitude of said inverted signal and the other of said signals and for providing a binary output signal representative of the result of said comparison, said binary output signal corresponding to the binary significance of the frequency shift signal conveyed by the conveying means.

2. The system set forth in claim 1 further comprising:

a wide bandwidth low pass filter responsive to the binary output signal of the comparing means for filtering logic slivers occurring at the zero crossover points of the compared signals.

3. The system set forth in claim 1 wherein said comparing means comprises a difference amplifier responsive to said inverted signal and the other of said signals for providing an output signal whenever a selected one of said signals is more positive than the other of said signals, and logic switching means responsive to the output signal of the difference amplifier and to the frequency shift signal for providing said binary output signal.

4. The system set forth in claim 1 wherein said differentiating means and said gain control means comprises two cascaded circuits, the first of said circuits being responsive to said conveying means for differentiating said frequency shift signal with respect to time and the second of said circuits being responsive to the output differentiated signal of said first circuit for differentiating said output differentiated signal with respect to time and providing an output signal representative of the second derivative with respect to time of the frequency shift signal, the gain of said cascaded circuits being proportional to the reciprocal of the square of said intermediate frequency.

5. A method for detecting the binary significance of a frequency shift signal having at least a first frequency and a second frequency representative of binary data comprising the steps of:

differentiating the frequency shift signal to obtain a differentiated signal representative of the second derivative with respect to time of the frequency shift signal;

controlling the gain of at least one of the differentiated signal and the frequency shift signal so that the relative gain of the differentiated signal is proportional to the reciprocal of the square of a frequency intermediate the first and second frequencies of the frequency shift signal;

inverting one of said differentiated signal and said frequency shift signal;

comparing the magnitude of the inverted signal with the other of said signals;

indicating the binary significance of the frequency shift signal in accordance with the result of the comparison.

6. The method for detecting the binary significance of a frequency shift signal as set forth in claim 5 wherein the gain of the differentiated signal is controlled by an amount proportional to the reciprocal of the square of a frequency intermediate the first and second frequencies of the frequency shift signal.

7. The method for detecting the binary significance of a frequency shift signal set forth in claim 5 wherein said differentiated signal is inverted and compared with the magnitude of the frequency shift signal.

* * * * *